United States Patent
Theimer et al.

(10) Patent No.: US 9,710,859 B1
(45) Date of Patent: Jul. 18, 2017

(54) DATA RECORD AUDITING SYSTEMS AND METHODS

(71) Applicant: Amazon Technologies, Inc., Seattle, WA (US)

(72) Inventors: Marvin Michael Theimer, Bellevue, WA (US); David John Ward, Jr., Seattle, WA (US); Léon Thrane, Issaquah, WA (US); Don Johnson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 922 days.

(21) Appl. No.: 13/928,234

(22) Filed: Jun. 26, 2013

(51) Int. Cl.
　*G07B 17/00*　　(2006.01)
　*G06Q 40/00*　　(2012.01)
　*G06Q 50/06*　　(2012.01)

(52) U.S. Cl.
　CPC ............. *G06Q 40/10* (2013.01); *G06Q 50/06* (2013.01)

(58) Field of Classification Search
　CPC .................................................... G06Q 50/06
　USPC ............................................ 705/30, 52, 412
　See application file for complete search history.

(56) References Cited

U.S. PATENT DOCUMENTS

| | | | |
|---|---|---|---|
| 2005/0246272 A1 | 11/2005 | Kitada et al. | |
| 2011/0022846 A1 | 1/2011 | Ginter et al. | |
| 2011/0137771 A1 | 6/2011 | Hamilton | |
| 2013/0308761 A1* | 11/2013 | Keene | H04M 3/2263 379/32.01 |
| 2014/0074731 A1* | 3/2014 | Lande | G06Q 40/025 705/306 |
| 2014/0282550 A1* | 9/2014 | Blumenfeld | G06F 9/5027 718/100 |

* cited by examiner

*Primary Examiner* — Hunter Wilder
(74) *Attorney, Agent, or Firm* — Knobbe, Martens, Olson & Bear, LLP

(57) ABSTRACT

Systems and methods are presented for processing and auditing data records using a stream based data processing system. Data output by data center computers may be collected and used to generate data records that include values for metrics related to computer resource consumption. These data records may be inserted into a stream which can include auditors and various other processors. The auditors may determine whether any of the data records include discrepancies. A gating processor can determine which processors, if any, to provide data records that include discrepancies. Further, an amendment processor can be used to resolve discrepancies detected by the auditors. In addition, a billing processor can be used to generate bills that identify the discrepancies and include information relating to the cause and actions taken in response to the discrepancies detected in the data records.

21 Claims, 12 Drawing Sheets

Billing Page

HOSTED SERVICE

USER: JOHN SMITH

CURRENT BILL
ARCHIVED BILLS
PAYMENT HISTORY

| DATE | | USAGE | COST/UNIT | TOTAL COST |
|------|---|-------|-----------|------------|
| 3/12/12 | | | | $1,770 |
| 902 | 908 — VM INSTANCES | 354 | $5 | $54 |
| | 910 — DATA BANDWIDTH | 27 GB | $2/GB | $40 |
| | 912 — STORAGE | 2 TB | $20/TB | |
| 3/13/12 | | * — 930 | | |
| 904 | 908 — VM INSTANCES | 23 GB | $2/GB | $46 |
| | 910 — DATA BANDWIDTH | | | $40 |
| | 912 — STORAGE | 2 TB | $20/TB | |
| 3/14/12 | | | | $1,645 |
| 906 | 908 — VM INSTANCES | 354 - 25** — 932 | $5 | $50 |
| | 910 — DATA BANDWIDTH | 27 - 2 GB*** | $2/GB | $40 |
| | 912 — STORAGE | 2 TB — 934 | $20/TB | |

920 — *INFORMATION UNAVAILABLE AT THIS TIME DUE TO A METERING DISCREPANCY
922 — **ADJUSTMENT DUE TO BILLING DISCREPANCY ON 3/7/12
 - DUE TO SERVER CRASH AT DATA CENTER 3
924 — ***DISCOUNT DUE TO BILLING DISCREPANCY ON 3/14/12
 - DUE TO LOSS OF ACCESS TO DATA CENTER 5 DUE TO EARTHQUAKE

LOGOUT    PRINT

FIG. 9

DATA RECORD AUDITING SYSTEMS AND METHODS

RELATED APPLICATION

This application is related to the following application that was filed on the same day as the present application and the disclosure of which is incorporated by reference in its entirety herein: U.S. application Ser. No. 13/928,229, filed Jun. 26, 2013, and titled "DATA RECORD GATING AND BILLING SYSTEMS AND METHODS."

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers operated by a single organization and public data centers operated by third parties to provide computing resources to customers. Public and private data centers may provide network access, power, hardware resources (e.g., computing and storage), and secure installation facilities for hardware owned by the data center, an organization, or by other customers. A number of data centers may be further organized as part of a single Program Execution Service (PES) that can facilitate the utilization of resources of the data centers by customers of the PES.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of resources on an "as needed" basis or at least on an "as requested" basis.

As the scale and scope of data centers has increased, the amount of metering and billing data has increased. The increase in the amount of metering and billing data has made accurately tracking, among other things, the usage of computing resources by different users and the generating of accurate bills challenging.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 9 illustrates an example graphical user interface (GUI) for a billing page.

DETAILED DESCRIPTION

Introduction

Figure 1:
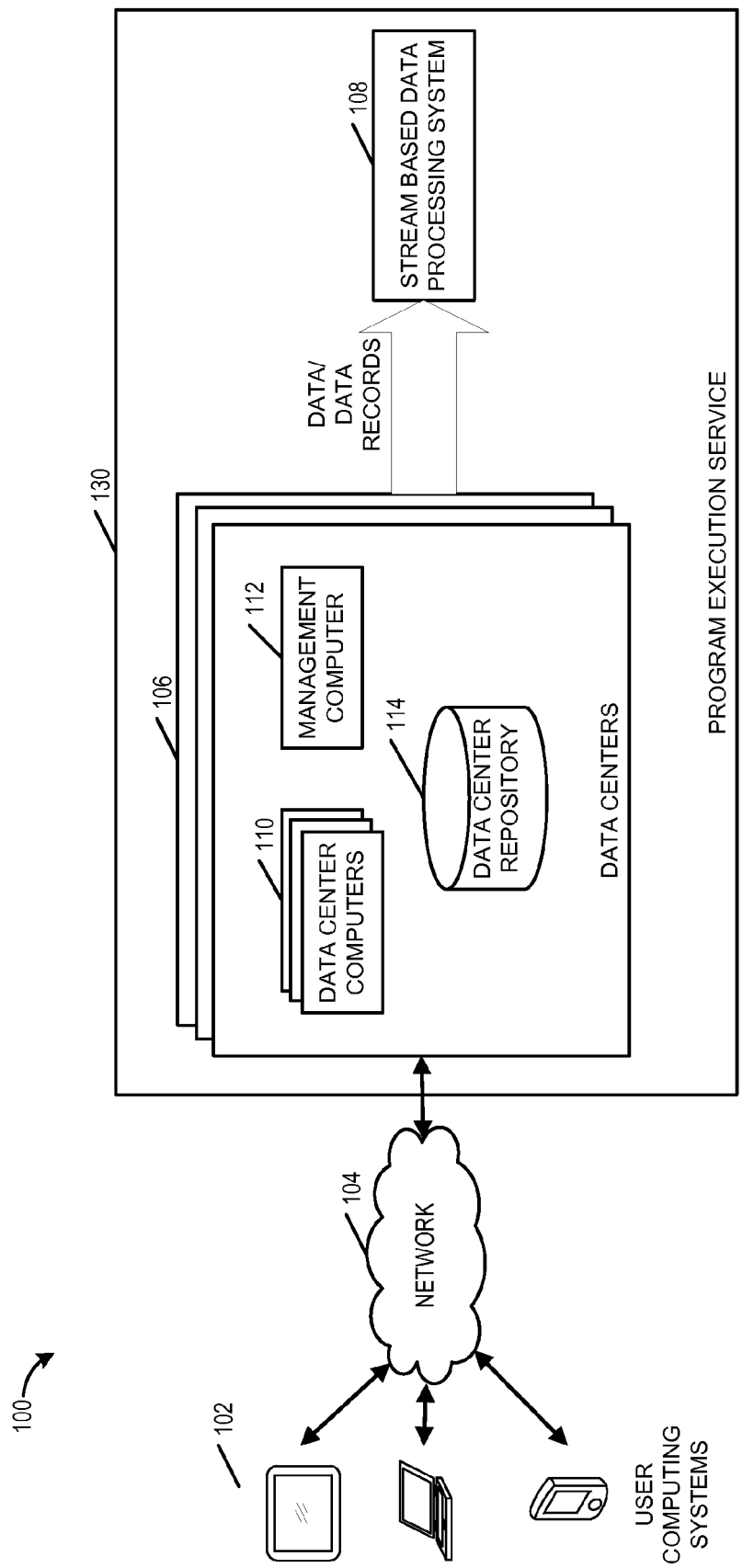
FIG. 1 illustrates an example of a network computing environment for providing data center computing resources to users via a communications network.

Data centers may produce and collect many types of data and metadata relating to the use of the data centers and the data center computers. This data may be used to generate reports relating to the usage of the data centers. Further, the data may be used to generate bills for the usage of the data center and its computing resources by users and/or entities. In a traditional environment, collecting the data and aggregating it to generate bills can be computationally expensive and often errors are introduced along the way. Further, it may be difficult to analyze the raw data to pinpoint the errors or to determine whether discrepancies are errors or exist for some other reason, such as for testing. Further, presenting incorrect bills to customers can cause public relations problems.

Some embodiments herein describe systems and methods for auditing data records to catch errors or discrepancies before bills, usage reports, or other user-facing information is presented to a user. Further, some embodiments herein describe systems and methods for gating data records that potentially include discrepancies. By gating data records with discrepancies, the discrepancies are not propagated to downstream or subsequent systems that may process or present the data associated with the data records to users.

The data records may include, or be based on, data generated by the data centers reflecting the use of the data centers and computing resources made available by the data centers to users. The types and forms of data records are not limited. For example, the data records may include a set of values or metrics associated with particular users, particular computing resources, particular data centers, or any type of data that an entity associated with a Program Execution Service (PES) desires to collect and track. For instance, one set of data records may include a virtual machine quantity metric that identifies a number of virtual machines instantiated or active, a virtual machine type metric that identifies the type of virtual machines active or associated with the data record, a time stamp identifying the time that the data was obtained, a user identifier identifying the user utilizing the virtual machines, and an entity identifier that identifies the entity, if any, associated with the user. Another set of data records may include an application identifier that identifies an executed application, a time of use measurement that identifies how long the application was used, and a user identifier identifying the user that used the application. In some cases, the metrics may include derived metrics. In some such cases, collected data for a metric may be provided to a system that processes the collected data, and in some instances, additional data associated with additional metrics, to determine the derived metric. For example, data associated with file storage utilized by users over a time period may be used in conjunction with data associated with file storage utilized by PES backup systems to determine a metric relating to a rate of storage utilization in the PES.

Example Network Computing Environment

FIG. 1 illustrates an example of a network computing environment 100 for providing data center computing resources to users via a communications network 104. The network computing environment 100 can include a Program Execution Service (PES) 130 platform that includes one or more data centers 106. The PES 130 can provide users with access to a number of computing resources hosted by the data centers 106. For example, the data centers 106 may provide users with access to applications, storage, workspace environments, processor resources, virtual machines, and the like. Users may access computing resources at the one or more data centers 106 using the user computing systems 102. These users may include organizations, or users associated with the organizations, as well as individual users. The user computing systems 102 may communicate with the data centers 106 via a network 104.

The user computing systems 102 can include any type of computing devices, including desktop computers, laptop computers, tablets, personal digital assistants (PDAs), mobile phones (including smart phones), electronic book readers, other wireless devices, set-top or other television boxes, media players, game platforms, and kiosks, among others. The network 104 can include any type of network including, for example, be a local area network, a wide area network, a wireless network, a cellular network, combinations of the same, and the like. In some embodiments, the network 104 can include the Internet.

The one or more data centers 106 can include one or more data center computers 110, management computers 112, data center repositories 114, and any other system that can facilitate providing a user with access to computing resources at the data centers 106. The data center computers 110 may provide users with access to applications or other computing resources that may be posted by the data center computers 110. For instance, the data center computers 110 may provide users with access to network storage services (including, but not limited to, cloud storage, database resources, queuing services, messaging services, etc.) computational or processing services, communication services, security services, etc. Further, in some cases, the data center computers 110 may provide users with access to one or more virtual instances of applications or computing resources, including access to virtual machines. In some embodiments, the data centers 106 may be part of a Program Execution Service (PES). Further examples of data centers are described in U.S. Pat. No. 7,865,586, issued on Jan. 4, 2011 and entitled "Configuring Communications Between Computing Nodes," which is hereby incorporated by reference in its entirety.

The management computer 112 may facilitate management of the data center 106 resources including access to the data center computers 110. For example, the management computer 112 may allocate access to the data center computers 110 to balance utilization of the data center computers 110. As a second example, the management computer 112 may allocate a user to a data center computer 110 based on the computing resource the user is attempting to access. Further, the management computer 112 may facilitate providing data and/or data records to a stream based data processing system 108.

The data center repository 114 can include any type of storage device for storing data related to accessing the data center computers 110. Further, the data center repository 114 may include data relating to the usage of the data center computers 110. For example, this usage data may include the number of instances accessed by a user or by users associated with an entity. As a second example, the usage data may include the applications accessed by a user, the amount of network bandwidth utilized by the user, the amount of storage space utilized by the user, and the like.

Data centers 106 may provide data and/or data records related to the use of the data center computers 110 to the stream based data processing system 108. As illustrated, the stream based data processing system 108 may be separate from the data centers 106 and may receive data and/or data records from a plurality of data centers 106. Alternatively, each data center 106 may be associated with a separate stream based data processing system 108. In some cases, the stream based data processing system 108 may be included as part of a data center 106. In other cases, the stream based data processing system 108 may be partly included in the data centers 106 and may be partly separate from the data centers 106.

The stream based data processing system 108 can include any system for processing data collected from the data centers 106 including for metering and billing purposes. The stream based data processing system 108 may process the data as a set or stream of data records. In some cases, the data records are received from a number of sources, such as, but not limited to, the data center computers 110 of the PES 130. In other cases, the data records are generated by the stream based data processing system 108 based on data received from or generated by the data sources. The data records may be of different types based on, for example, the types of data collected, the sources of the data, the users associated with the generation of the data, etc. In some cases, the stream based data processing system 108 processes data records as they are received. In other cases, data records are batched together and then processed.

Further, the stream based data processing system 108 may include systems for auditing the data collected from the data centers 106. Although not limited as such, the auditing of the data is performed to ensure accurate metering and billing. Advantageously, in certain embodiments, the inclusion of auditors enables the processing of data records where accuracy is important. In some cases, statistical monitoring systems can tolerate a degree of data loss or discrepancy and still function effectively or within specification. However, some functions, such as metering and billing, security, intrusion detection, etc., require a high degree of accuracy and do not tolerate data loss or discrepancies. The inclusion of the auditors (described in more detail below) in the data centers 106, or the PES 130, enable the processing of data records for such functions that require minimal to zero discrepancies. The stream based data processing system 108 is described in further detail with respect to the FIGS. 2A and 2B.

Example Stream Based Data Processing System

Figure 2A:
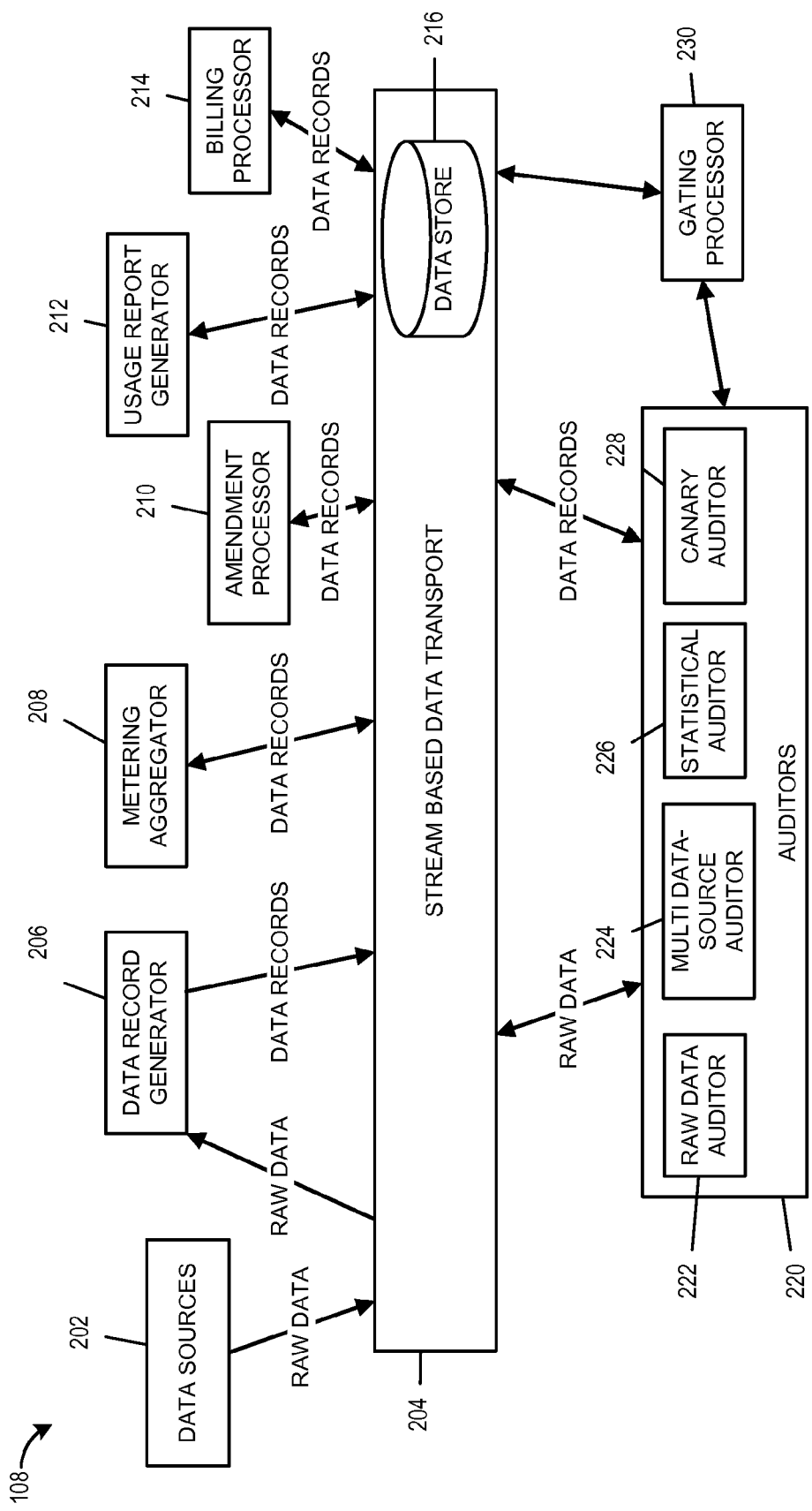
FIG. 2A illustrates an example of a stream based data processing system for processing data records.
Figure 2B:
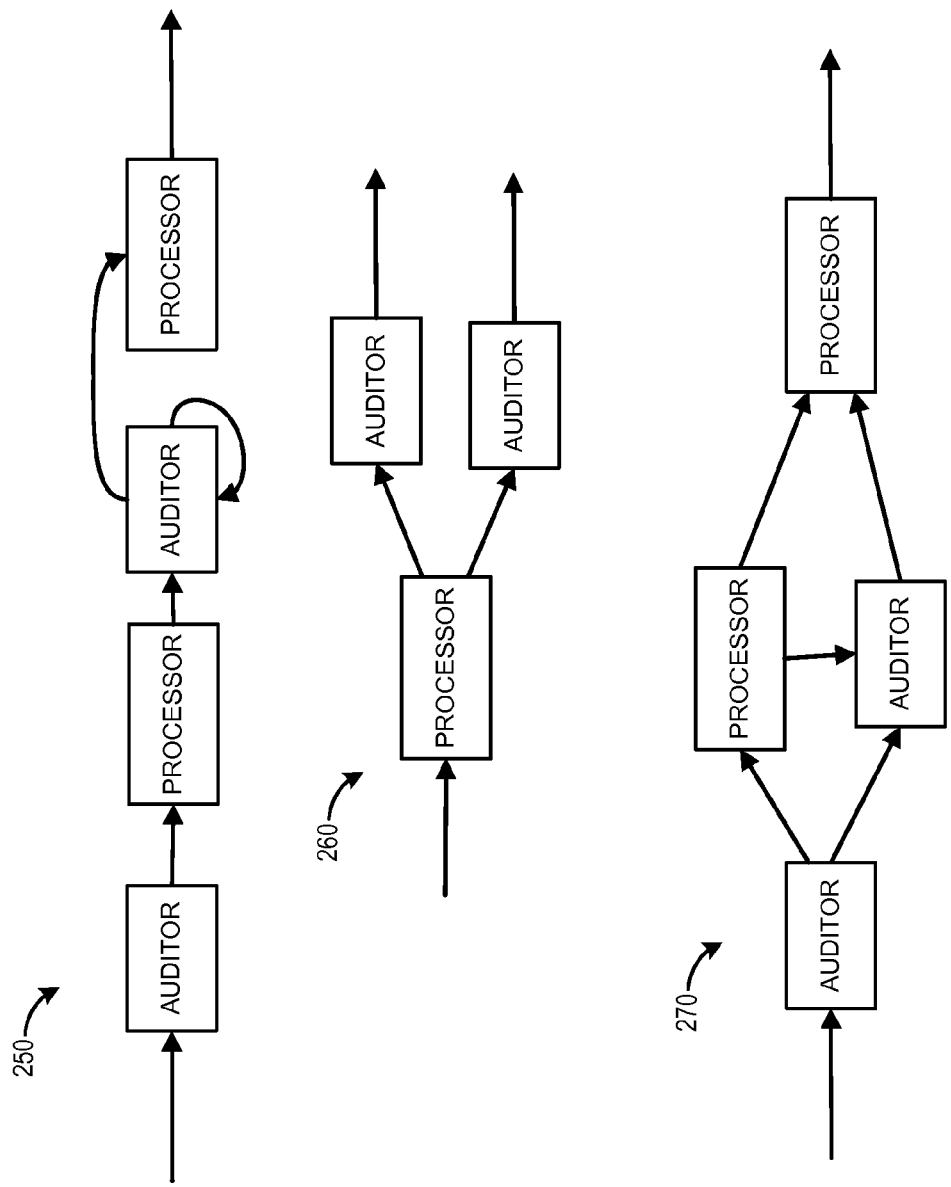
FIG. 2B illustrates several additional examples of stream configurations for stream based data processing systems.

FIG. 2A illustrates an example of a stream based data processing system 108 for processing data records. The stream based data processing system 108 may be configured to make data and/or data records available to one or more processors and/or one or more auditors for processing by providing the data to a stream based data transport 204. The stream based data transport 204 may include any system for transmitting data and/or data records between the one or more processors and/or the one or more auditors. In some embodiments, the stream based data transport 204 includes a data store 216 for storing the data and/or data records. The data store 216 may include any type of system for storing data and/or data records. For example, the data store 216 may include a relational database. The processors and/or auditors can access the data and/or data records by accessing the data store 216. Although illustrated as a physical element, in some cases, the stream based data transport 204 may be a conceptual element illustrating the flow of data records between one or more processors and/or one or more auditors. Examples of different configurations for the flow of the data and/or data records between the processors and/or auditors are illustrated in FIG. 2B, which is described in further detail below.

Data may be obtained by the stream based data transport 204 from one or more data sources 202. This data may include raw data, or data associated with a specific metric, that has not been aggregated or stored in a data record. The data sources 202 can include any system that can generate data for processing in a stream based system, or as part of a time series of data records. For example the data sources 202 can include one or more data centers 106 or one or more data center computers 110. Although illustrated as part of the stream based data processing system 108, in some cases, the data sources 202 are not included as part of the stream based data processing system 108.

Data obtained from the data sources 202 may be provided to a data record generator 206, which may create data records based, at least in part, on the data received from the data sources 202. For instance, a data record may be generated based on data that relates to a user's usage of a computing system at a data center for a session or time period. This data record might include the user's identifier, login time, logoff time, virtual machines instantiated by the user, applications accessed by the user, data stored by the user, data received at or transmitted from the data center in response to the user's actions, etc. Further, the data records may be created as part of a time series of data records. In such cases, data associated with a particular time may be included in one data record and data associated with a subsequent period of time may be included in a subsequent data record. The stream based data processing system 108 may include data records generated from any number of sources. For example, data records may be received, or generated based on data received, from hundreds, thousands, or hundreds of thousands of computing systems. Further, data records may be processed by different systems of the stream based data processing system 108 based, for example, on the type of data record or the user with which the data record is associated. Moreover, different subsets of the data records may be processed in series, in parallel or in some combination of the two.

In some embodiments, the data received from the data sources 202 may be received as data records. In such cases, the data record generator 206 may be optional. Further, in some embodiments, the data record generator 206 may be included with the data sources 202. Thus, for example, the data record generator 206 may be included as part of the data centers 106. Further, the data records may be a series of data records that can represent the usage of resources over time. In some cases, data records are processed by the stream based data processing system 108 as they are received or generated. In other cases, set of data records are collected over a time period and are then processed as a batch (e.g., every hour, every day, etc.).

The stream based data processing system 108 can include any number of auditors 220. The auditors 220 can include any type of auditor. For example the auditors 220 can include a raw data auditor 222, a multi data-source auditor 224, a statistical auditor 226, and they canary auditor 228. The raw data auditor 222 can include any type of auditor for auditing the raw data, or data, received from the data sources 202.

The multi data-source auditor 224 can include any type of auditor for auditing data or data records received from more than one source. In some cases, some of the sources of data records may be from systems that generate the data and/or data records, such as a data center computer 110, and some of the sources of data and/or data records used by the multi data source auditor 224 may be obtained from systems or repositories that provide processed or aggregated data, but which may not have generated the original data. For example, in some cases, some of the data sources may be the data centers 106, which may track and provide data, real-time or otherwise, related to use of computing resources at the data centers 106. Further, in some cases, some of the data sources may be relational databases that track, for example, the time and date that each virtual machine is instantiated, or computing resource is accessed, and the length of time the virtual machine is active before being suspended or shut down. In certain embodiments, the multi data-source auditor 224 may function as a double entry bookkeeping system by comparing data or data records generated based on data received from two or more different sources that may be at least partially independent of each other. In some such embodiments, a mismatch in the compared data or data records may identify a discrepancy in the network computing system 100 or a component system thereof (e.g., a data center computer 110, a data collection system, etc.).

The statistical auditor 226 can include any type of auditor for determining whether a data record or a set of data records from a data source matches an expected data record or set of data records based on a statistical relationship with data of data records received from another source. In some embodiments, the statistical auditor 226 can determine whether a data record or set of data records from a data source matches a historical trend for the data source within a degree of threshold.

The canary auditor 228 can include any type of auditor that can determine whether a processor is malfunctioning by providing a known set of data records (e.g., test data records) to the processor and determining whether a processor produces an expected output based on the known set of records. In some embodiments, the processor may be a billing processor (e.g., the billing processor 214). In such cases, the known set of data records may be metering records and the expected output may be a billing report.

Although each of the auditors is illustrated as being part of the auditors module 220, in some cases each of the auditors may be separate or distinct systems. Further, in some cases, one or more of the auditors may be combined into a single system. In such cases, a control signal may select which auditing process to perform. In other cases, multiple auditing processes may be performed over the same data records in response to the auditor receiving the data records. For instance, a combined auditor may include both the multi data-source auditor 224 and the statistical auditor 226. The combined auditor receives data records both a multi data-source auditing process and a statistical auditing process may be performed on the data records in other cases a control signal may select from the statistical auditing process and the multi data-source auditing process.

As previously stated, the stream based data processing system 108 can include a number processors for processing data and/or data records received from one or more data sources. For example, the stream based data processing system 108 can include an amendment processor 210, a usage report generator 212, a billing processor 214. The amendment processor 210 can include any system that can amend a data record. Amending a data record can include amending a value for a metric included with the data record. In some embodiments, the amendment processor 210 can amend the value for the metric by generating a new data record which replaces the data record with the old value. Alternatively, in some cases, the amendment processor 210 may generate a new data record with a value which in combination with the previous data record results in the desired value for the metric. For example, if the data record as a value of 27 GB associated with a metric for quantity of data stored in a storage system and an auditor determines at the value should be 25 GB, the amendment processor 210 can modify the 27 GB value, can generate a new data record with the 25 GB value, or can generate a new data record with a −2 GB value, which in combination with the old data record results in the desired 25 GB value.

The usage report generator 212 can include any system for generating a report relating to the usage of one or more computing resources based on the data associated with the data records provided to the usage report generator 212. For example, the usage report generator 212 can be used to generate a report regarding the number of virtual machines a customer used within a month. As a second example, usage report generator 212 can be used to generate a report regarding the number of virtual machines used by all employees of an entity. Further, in some cases, the usage report generator 212 can be used to generate a report relating to discrepancies identified in the data records received at the stream based data processing system 108.

Billing processor 214 can include any system for generating a bill from one or more data records. These bills may be final bills that are presented to a customer for payment or they may be estimates that are presented to customers upon request or per a set of billing rules. Further the bills may be generated from the time period. For example the bills may be generated on a monthly basis, on a daily basis, the usage basis (e.g., each time a computing resource is used), or upon request by a user.

In some cases, data records are processed by the various processors and auditors as the data records are received by the stream based data processing system 108, or the stream based data transport 204. In other cases, at least some of the processors and/or auditors may process data records at a scheduled point in time or during specific time periods. In such cases, the data records may be aggregated or batched together for processing during the scheduled point in time for a particular processor or auditor. The granularity in which data records are processed may be dependent on the type of data record, auditor and/or processor processing the data record, a command provided by a user (e.g., an administrator), etc.

In some cases, the data records may be aggregated together by a metering aggregator 208. Metering aggregator 208 can include any system that can aggregate data records. The some cases, the metering aggregator 208 may aggregate values associated with particular metrics of the data records. For example, if a set of data records relate to the consumption of bandwidth at the data center computers 110, the metering aggregator 208 can aggregate a bandwidth value stored in each data record of the set of data records.

Some embodiments, the stream based data processing system 108 may also include a gating processor 230. The gating processor 230 can include any system that can determine whether a data record should be accessible by one or more processors. The decision of whether to make a data record accessible to a processor may be based on whether a discrepancy is identified in the data record by one or more of the auditors 220. In some cases, the gating processor 230 may prevent some processors from accessing the data record while enabling other processors to access the data record. Further, in some embodiments, the gating processor 230 may decide whether information from the data record can be included on a bill generated by the billing processor 214. Gating processor 230 may decide what information is permissible to present to a user based on the specific user in a set of billing rules associated with one or more of the user and the entity associated with the stream based data processing system 108.

FIG. 2B illustrates several additional examples of stream configurations for stream based data processing systems. These stream configurations represent different configurations for the flow of the data and/or data records processors and/or auditors previously described with respect to FIG. 2A. The arrows in the figure can represent streams of data or data records, and the boxes may represent processors or auditors that consume streams of data records and potentially produce additional streams of data records. For example, the stream configuration 250 represents a data record stream where data records are first provided to an auditor (e.g., a statistical auditor 226). The data records output by this auditor can then be provided to a processor (e.g., an amendment processor 210) and the processed data records may be provided to a subsequent auditor. The data records output by the subsequent auditor can be re-audited by the auditor and/or provided to yet another processor.

As another example of a stream configuration, the stream configuration 260 may provide receive data records to a processor and the processed data records may then be provided to two different auditors. The stream configuration 270 represents a third example of stream configuration. With the stream configuration 270, data records may first be processed by a first auditor and then provided to both a first processor and a second auditor. The second auditor may also receive data records that of been processed by the first processor. Further both the first processor and the second auditor may provide data records to a second processor for further processing.

As can be seen from the examples in FIG. 2B, a number of configurations are possible for a stream based data processing system 108. The example stream configurations presented in FIG. 2B are just a few non-limiting examples for stream based data processing systems.

Although data records have primarily been described as being received and processed in a time series, like a stream of data or data records, the stream based processing system 108 is not so limited. For example, data records may be stored on a file system of one or more storage devices (e.g., the data store 216). These data records may be stored on the file system by one or more data records sources as well as by subsequent processors (e.g., the metering aggregator 208) of the data records. The data records may be stored at the file system with a time stamp that enables the processing of the data records as a time series and/or enables the processing of data records for particular time periods. Thus, processors and auditors may access a set of data records of a particular time period for processing or auditing.

As another example, data records may be stored at a database, which may be located at the data store 216. The data records can be sorted by time stamp and accessed by any processor or auditor of the stream based data processing system 108.

Example Multi Data-Source Auditing Process

Figure 3:
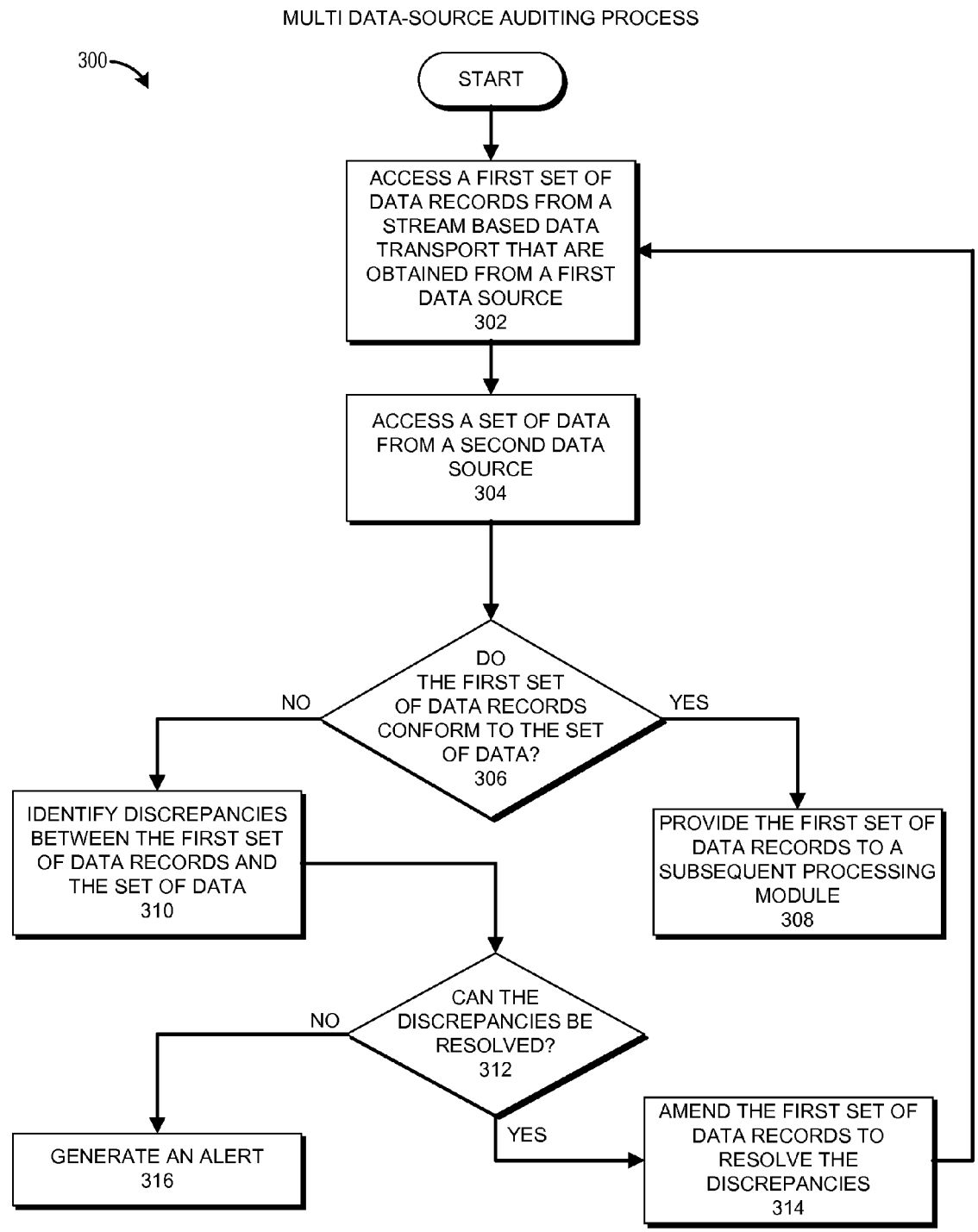
FIG. 3 presents a flowchart for an example of a multi data-source auditing process.

FIG. 3 presents a flowchart for an example of a multi data-source auditing process. The process 300 can be implemented by any system that can audit data and/or data records from multiple sources. For example, the process 300, in whole or in part, can be implemented by the auditors 220, the multi data-source auditor 226, the data store 216, and the data record generator 206, to name a few. Although any number of systems, in whole or in part, can implement the process 300, to simplify discussion, the process 300 will be described with respect to particular systems.

The process 300 begins at block 302 when the multi data-source auditor 226, for example, accesses a first set of data records from a stream based data transport 204 that are obtained from a first data source. The first data source may include any system that can generate data for processing by a metering or billing system. At block 304, the multi data-source auditor 226 accesses a set of data from a second data source. In some cases, the set of data may include additional data records from the second data source. These additional data records may, in some cases, correspond to the data records received at the block 302. In some such cases, although the data records received from both sources may correspond to each other, they may not be identical. For example, if a processor introduced an error into the data records, the data records from the two sources may differ.

In some cases, the data records may include additional data records from the first data source. In yet other cases, a set of data may include metadata or other data associated with the first data source. In some such cases, the second data source may be a relational database or repository, such as the data store 216, that is capable of storing the metadata or other data associated with the first data source. Further, in some cases, one or more of the first data source and the second data source may not be the progenitors of the data or data records, but may instead be other systems that processed the data records or previously accessed the data records and then passed the data records or a modified form of the data records to the auditor for process. Thus, in such cases the data sources providing the data records at the block 302 and/or the data at the block 304 may not be the original sources for the data records and/or data.

In some embodiments, the first set of data records and the set of data or data records from the second data source may be at least partially independent of each other. In some cases, the data of the first set of data records and the data of the block 304 may be associated with the same event or may be associated with the same consumption of computing resources. However, the data may be collected from two different points in the PES 130. For example, the first set of data records may include data collected at each of the data center computers 110 of a data center 106 relating to the network bandwidth utilized by each of the computers and the data of the block 304 may relate to the receipt and transmission of data at a border gateway between the data center 106 and an external network (e.g., the network 104). Although both the data records of the block 302 and the data of the block 304 relate to the same resource consumption, the utilization of network bandwidth, the data is collected at different points of the PES 130. Further, the data is partially independent as, for example, some of the data of the block 304 may include network consumption by the management computer 112, as well as other sources or may be based on different metrics to obtain the network utilization.

At decision block 306, the multi data-source auditor 226 determines whether the first set of data records conforms to the set of data. Determining whether the first set of data records conforms to the set of data may include determining whether the first set of data records matches the set of data. Alternatively, determining whether the first set of data records conforms to the set of data may include performing one or more operations or mathematical functions on each set of data records, or on values for metrics included in each set of data records, to obtain a result. The result from the operations performed on each set of data records may then be compared to determine whether a discrepancy exists. In some embodiments, the operation is performed on the set of data records obtained at the block 302 and compared to a value associated with the set of data obtained at the block 304. For example, the multi data-source auditor 226 may sum values for a metric included in each of the first set of data records and determine whether the sum matches a corresponding value in the set of data obtained at the block 304. As a second example, the multi data-source auditor 226 may calculate a variance of values for a metric included in the first set of data records and determine whether the variance matches a corresponding variance calculated for the values for the metric included in the second set of data records.

If the first set of data records do conform to the set of data, the multi data-source auditor 226 provides the first set of data records to a subsequent processing module at block 308. The subsequent processing module can include any module that can process the set of data records. For example, the subsequent processing module can be a metering module, a billing processor, a logging module, and the like. Further, in some cases, instead of providing the first set of data records to a subsequent processing module, the multi data-source auditor 226 may mark the first set of data records or metadata associated with the first set of data records as having been successfully audited. In some embodiments, the block 308 may be optional.

If the first set of data records do not conform to the set of data, the multi data-source auditor 226 identifies discrepancies between the first set of data records and the set of data at block 310. Discrepancies may include any type of difference between metrics of the first set of data records and the data of the block 304. For instance, if the sum of a data storage utilization metric across a set of data records associated with a user is 15 GB, but a database that tracks available data storage at a storage system of the PES 130 indicates that the availability of storage over the same time period decreased 16 GB, then a discrepancy may be identified because the two sources of data do not conform.

At decision block 312, the multi data-source auditor 226 determines whether the discrepancies can be resolved. In some cases, the decision block 312 includes determining whether the discrepancies can be resolved automatically. Advantageously, in certain embodiments, the automatic discrepancy resolution results in more accurate bills. For instance, in cases of manual resolution, users may not be charged for the use of computing resources at a particular time period, or the user may be charged at a lower rate because an employee of an entity may not be able to determine a source of a discrepancy or how to resolve an identified discrepancy in, for example, a metering system. However, with automatic discrepancy resolution, data in some cases may be tracked at a finer granularity than with a manual resolution process enabling the resolution of more discrepancies, thereby resulting in more accurate billing. Determining whether the discrepancies can be resolved can include any number of resolution processes. For example, determining whether the discrepancies can be resolved may include accessing a third data source to confirm the accuracy of data. As another example, determining whether the discrepancies can be resolved may include accessing a set of rules for determining procedures for resolving different types of discrepancies.

If the multi data-source auditor 226 determines that the discrepancies cannot be resolved at the decision block 312, the multi data-source auditor 226 generates an alert at block 316. The alert may be presented to a user, such as an administrator, by email, text message, a pop-up dialog box, or any other method for presenting an alert to a user. In some cases, the block 316 may include logging the discrepancy.

If the multi data-source auditor 226 determines that the discrepancies can be resolved at the decision block 312, the multi data-source auditor 226 amends the first set of data records to resolve the discrepancies at block 314. In some cases, the multi data-source auditor 226 may use the amendment processor 210 to amend the data records. Alternatively, or in addition, one or more of the first set of data records may be marked as including a discrepancy thereby, enabling a subsequent processor (e.g., the amendment processor 210, or a billing processor 214) to resolve the discrepancy.

In some embodiments, if the multi data-source auditor 226 determines that the discrepancies cannot be resolved by amending the data record, the multi data-source auditor 226 may take one or more substitute or additional actions to resolve the discrepancies. For example, the multi data-source auditor 226 may resolve the discrepancy by deleting one or more data records associated with the discrepancy. In some embodiments, the block 314 may be optional. For example, in some cases, the identified discrepancies may be known and/or planned discrepancies and may not require resolution at the time the discrepancy is detected by the multi data-source auditor 226. In some embodiments, after amending or resolving discrepancies the first set of data records at the block 314, the process 300 may return to the block 302 thereby enabling the amended first set of data records to be audited. In other embodiments, the process 300 may end after completion of the block 314.

Although the process 300 has been described with respect to two data sources, in some cases the process 300 may be performed with more than two data sources. Further, although the process 300 has been described as comparing data records from a first source and data corresponding to the data records, in some cases the process 300 may be performed by obtaining data records from two different data sources and comparing the data records from the two different data sources at the block 306.

Example Statistical Correlation Process

Figure 4A:
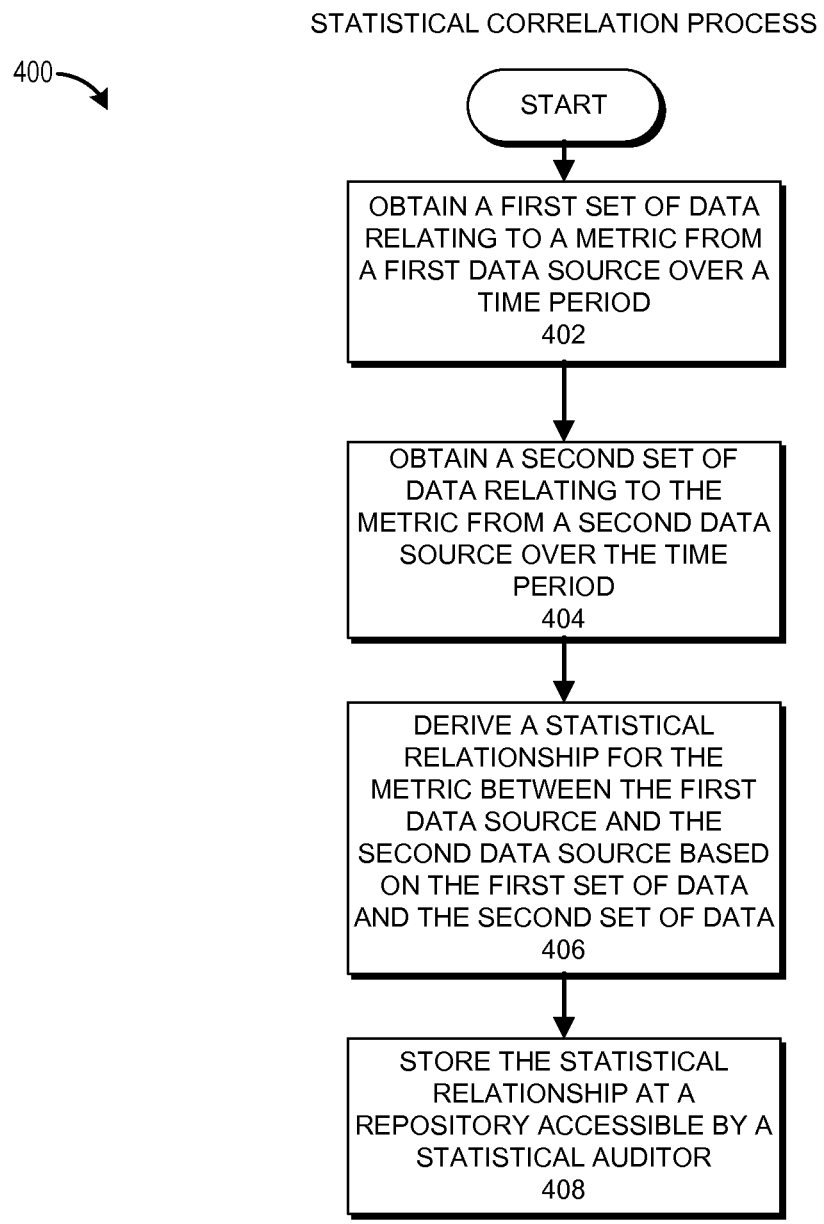
FIG. 4A presents a flowchart for an example of a statistical correlation process.

FIG. 4A presents a flowchart for an example of a statistical correlation process 400. The process 400 can be implemented by any system that can determine a statistical correlation between data, or data records, from two different data sources. For example, the process 400, in whole or in part, can be implemented by the auditors 220, the statistical auditor 226, the data store 216, and the data record generator 206, to name a few. Although any number of systems, in whole or in part, can implement the process 400, to simplify discussion, the process 400 will be described with respect to particular systems.

The process 400 begins at the block 402 when the statistical auditor 226, for example, obtains a first set of data relating to a metric from a first data source over a time period. In some cases, obtaining the first set of data includes obtaining a first set of data records that includes values for one or more metrics. These metrics can include any type of metric that an entity associated with the data centers 106 has selected to track and measure. For example, the metrics can relate to CPU compute time, data consumption, network usage, instance usage, virtual machine usage, and the like. In some embodiments, the first data source may be a set of sources. For example, if the metric relates to network usage, the first data source may include any system that communicates with a particular Border Gateway Protocol (BGP) router.

At block 404, the statistical auditor 226 obtains a second set of data relating to the metric from a second data source over the time period. In some cases, the second data source may be collecting the same data as the first data source. In other cases, the second data source may be collecting corresponding data from another collection point in the PES 130. For example, the second data source may be an internal BGP (iBGP) router at one point in the system and the first data source may be another iBGP router.

The statistical auditor 226, at block 406, derives a statistical relationship for the metric between the first data source and the second data source based, at least in part, on the first set of data and the second set of data. In some cases, the metric accessed from data records of the first data source may be the same as the metric accessed from data records of the second data source. In other cases, the metrics from the two different sets of data records may differ, but be related. For example, the first set of data records may relate to data going into a BGP router, and the second set of data records may relate to data going out of the BGP router. Thus, at the block 406, the statistical auditor 226 may determine the relationship between data that enters a BGP router and data that exists the BGP router. At block 408, the statistical auditor 226 stores the statistical relationship data at a repository accessible by the statistical auditor 226, such as at the data store 216.

Example Historical Statistical Correlation Process

Figure 4B:
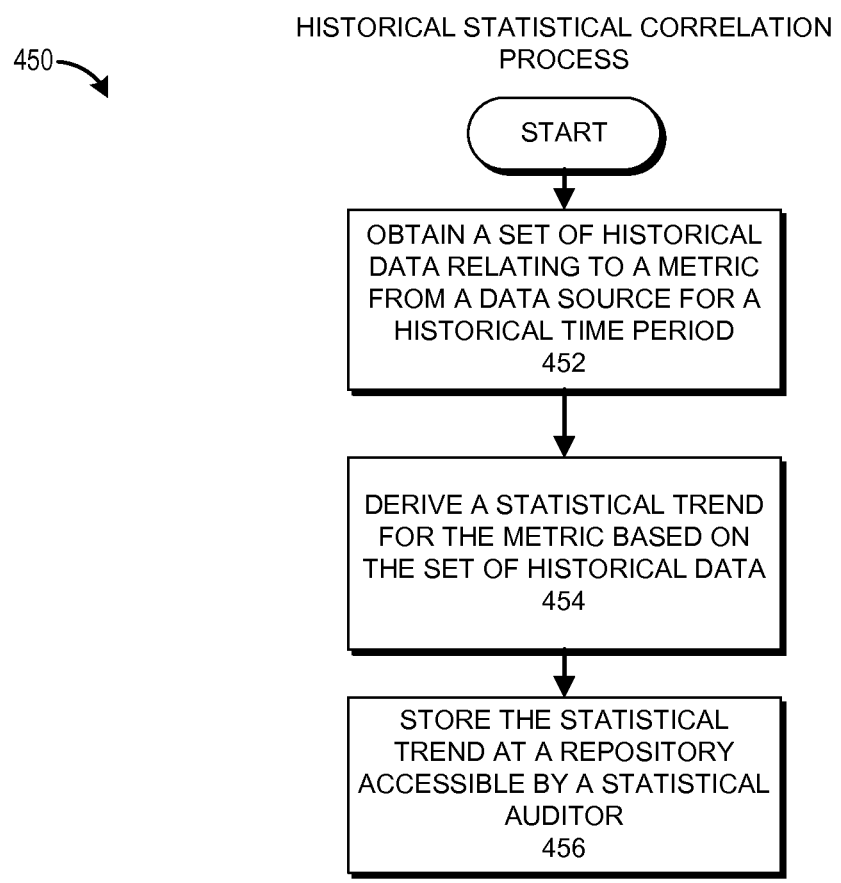
FIG. 4B presents a flowchart for an example of a historical statistical correlation process.

FIG. 4B presents a flowchart for an example of a historical statistical correlation process 450. The process 450 can be implemented by any system that can determine a statistical trend for data, or data records, from a data source. For example, the process 450, in whole or in part, can be implemented by the auditors 220, the statistical auditor 226, the data store 216, and the data record generator 206, to name a few. Although any number of systems, in whole or in part, can implement the process 450, to simplify discussion, the process 450 will be described with respect to particular systems.

The process 450 begins at the block 452 when the statistical auditor 226, for example, obtains a set of historical data relating to a metric from a data source for a historical time period. This historical time period can include any time period designated for determining a statistical trend for a metric. Further, in embodiments where the process 450 is repeated for a metric on a periodic basis, the historical time period may be a shifting time period or time window.

At block 454, the statistical auditor 226 derives a statistical trend for the metric based, at least in part, on the set of historical data obtained at the block 452. The statistical trend can include any type of algorithm for identifying a trend in data or for aggregating data. For example, the statistical trend may be determined by averaging the set of historical data, determining a standard deviation for the set of historical data, determining a mode value for the set of historical data, and the like. The statistical auditor 226 may store the statistical trend associated with the metric a repository, such as the data store 216, accessible by a processor or auditor, such as the statistical auditor 226.

Example Statistical Auditing Process

Figure 5A:
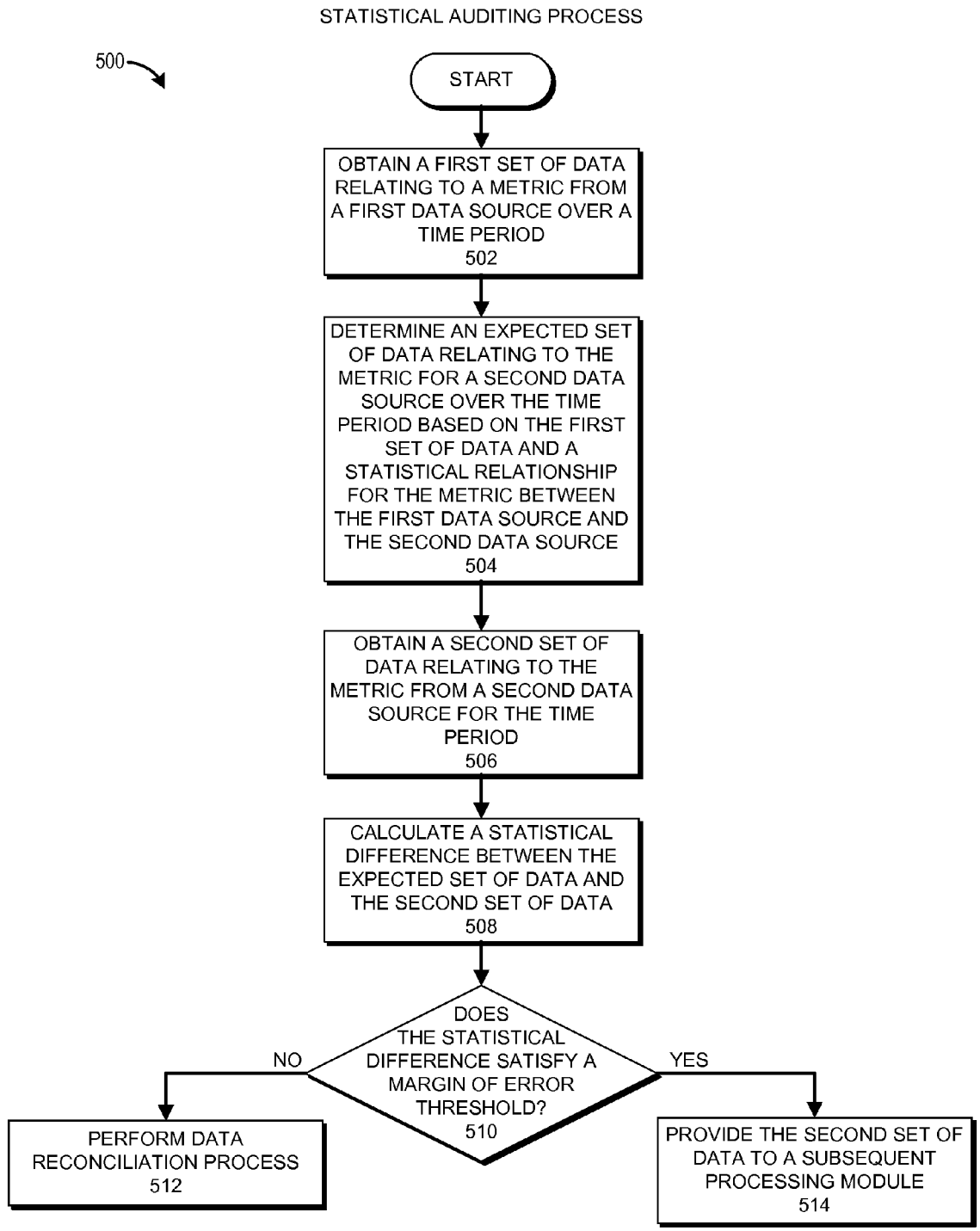
FIG. 5A presents a flowchart for an example of a statistical auditing process.

FIG. 5A presents a flowchart for an example of a statistical auditing process 500. The process 500 can be implemented by any system that can audit data, or data records, based on a statistical relationship between two or more data sources. For example, the process 500, in whole or in part, can be implemented by the auditors 220, the statistical auditor 226, the data store 216, and the data record generator 206, to name a few. Although any number of systems, in whole or in part, can implement the process 500, to simplify discussion, the process 500 will be described with respect to particular systems.

The process 500 begins at the block 502 when the statistical auditor 226, for example, obtains a first set of data relating to a metric from a first data source over a time period. At block 504, the statistical auditor 226 determines an expected set of data relating to the metric for a second data source over the time period based, at least in part, on the first set of data and a statistical relationship for the metric between the first data source and the second data source. The block 504 may include accessing a repository, such as the data store 216, to obtain the statistical relationship between the first data source and the second data source. Using the statistical relationship obtained from the repository, the statistical auditor 226 may derive the expected set of data based on the first set of data obtained at the block 502. For example, assuming the metric relates to a count of active virtual machine instances, if the data from the first data source and the data from the second data source are associated with a one-to-one relationship, then the expected set of data should be the same number of active virtual machines as indicated by the first set of data.

As another example, suppose the metric being measured is the network usage by the data centers 106. In some cases, discrepancies in the network usage metric may be identified by comparing the statistical relationship of network usage between two data sources. For instance, suppose that the sum of all the bytes transferred between data center computers 110 and a network external to the data centers 106 (e.g., the Internet) as measured by the data center computers 110 is statistically 5% lower than the total bandwidth reported by the gateway routers of the data centers 106 as determined, for example, using the process 400. In such an example, if the first set of data (e.g., the data obtained at the block 502) is X, the sum of all the bytes transferred between data center computers 110 and a network external to the data centers 106, then the expected set of data for measure of total bandwidth as reported by the gateway routers of the data centers 106 is X–5%. In the previous example, the statistical difference may be due to any number of factors, such as communication between geographically diverse data centers 106 by management computers 112 or access to monitoring systems at the data centers 106 by administrators.

At block 506, the statistical auditor 226 obtains a second set of data relating to the metric from a second data source for the time period. The statistical auditor 226 calculates a statistical difference between the expected set of data and the second set of data at block 508. For example, the statistical auditor 226 may determine the variance or the percentage difference between the expected set of data and the second set of data. In some cases the statistical auditor 226 may determine an absolute difference between the expected set of data and the second set of data at the block 508.

At decision block 510, the statistical auditor 226 determines whether the statistical difference calculated at block 508 satisfies a margin of error threshold. If the statistical difference does not satisfy a margin of error threshold, the statistical auditor 226 performs a data reconciliation process at block 512. In some embodiments, the statistical auditor 226 may use the amendment processor 210 to perform the data reconciliation process. The data reconciliation process can include any process for resolving discrepancies in data provided by a data source. For example, the data reconciliation process may include amending the data with the discrepancy, alerting a user (e.g., an administrator), deleting the data associated with the discrepancy, combinations of the same, and the like. In some embodiments, the block 512 may include performing the processes associated with the blocks 312, 314, and 316.

If it is determined at the decision block 510 that the statistical difference does satisfy a margin of error threshold, the statistical auditor 226 provides the second set of data to a subsequent processing module at block 514. The subsequent processing module can include another auditor, such as a multi data-source auditor 224. Alternatively, the subsequent processing module may include any type of processor capable of performing the process using the second set of data. For example, the subsequent processing module could be a metering aggregator 208, a usage report generator 212, a billing processor 214, and the like. Further, in some cases, in addition to, or in place of, providing the second set of data to a subsequent processing module, the second set of data may be provided to a repository, such as the data store 216.

Example Historical Statistical Auditing Process

Figure 5B:
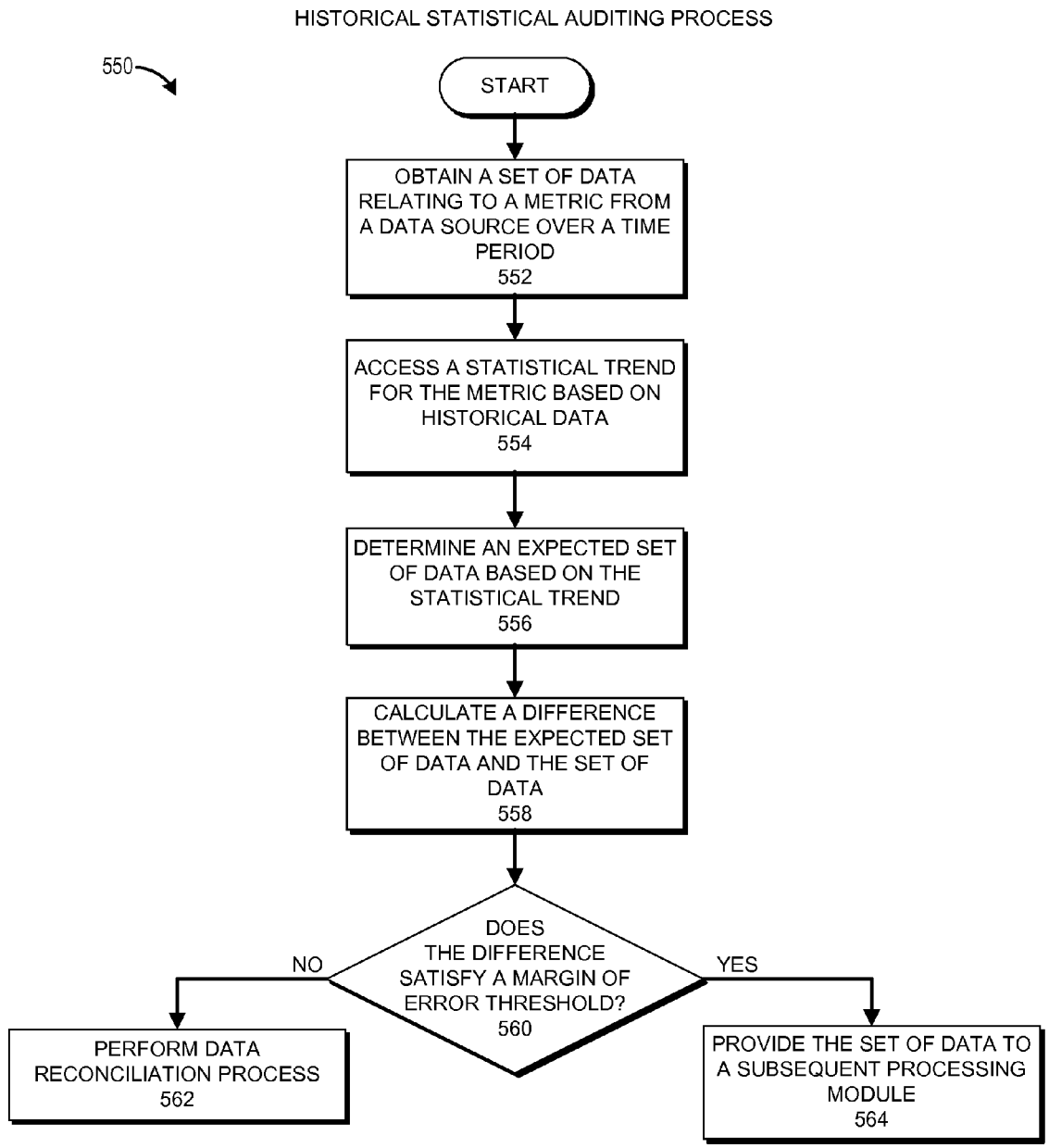
FIG. 5B presents a flowchart for an example of a historical statistical auditing process.

FIG. 5B presents a flowchart for an example of a historical statistical auditing process 550. The process 550 can be implemented by any system that can audit data, or data records, from a data source based on a statistical trend establish from historical data generated or provided by the data source. For example, the process 550, in whole or in part, can be implemented by the auditors 220, the statistical auditor 226, the data store 216, and the data record generator 206, to name a few. Although any number of systems, in whole or in part, can implement the process 550, to simplify discussion, the process 550 will be described with respect to particular systems.

The process 550 begins at the block 552 when the statistical auditor 226, for example, obtains a set of data relating to a metric from a data source over a time period. At block 554, the statistical auditor 226 accesses a statistical trend for the metric based on historical data. The statistical trend information may be accessed from a repository, such as the data repository 216, associated with the data source.

At block 556, the statistical auditor 226 determines an expected set of data for the time period based on the statistical trend accessed at the block 554. The statistical auditor 226, at block 558, calculates a difference between the expected set of data and the set of data received at the block 552. At decision block 560, the statistical auditor 226 determines whether the difference calculated at the block 558 satisfies a margin of error threshold. In some embodiments, the decision block 560 includes determining a statistical difference between the expected set of data and the set of data. In other embodiments, the statistical auditor 226 determines an absolute difference at the decision block 560.

If the statistical auditor 226 determines at the decision block 560 that the difference between the expected set of data and the set of data obtained at the block 552 does not satisfy a margin of error threshold, the statistical auditor 226 performs a data reconciliation process at the block 562. In some embodiments, the block 562 may include one or more of the embodiments described above with respect to the block 512.

If the statistical auditor 226 determines that the difference between expected set of data and the set of data obtained at the block 552 does satisfy a margin of error threshold, the statistical auditor 226 provides the set of data to a subsequent processing module at the block 564. In some embodiments, the block 564 may include one or more of the embodiments described above with respect to the block 514.

Example Canary Auditing Process

Figure 6:
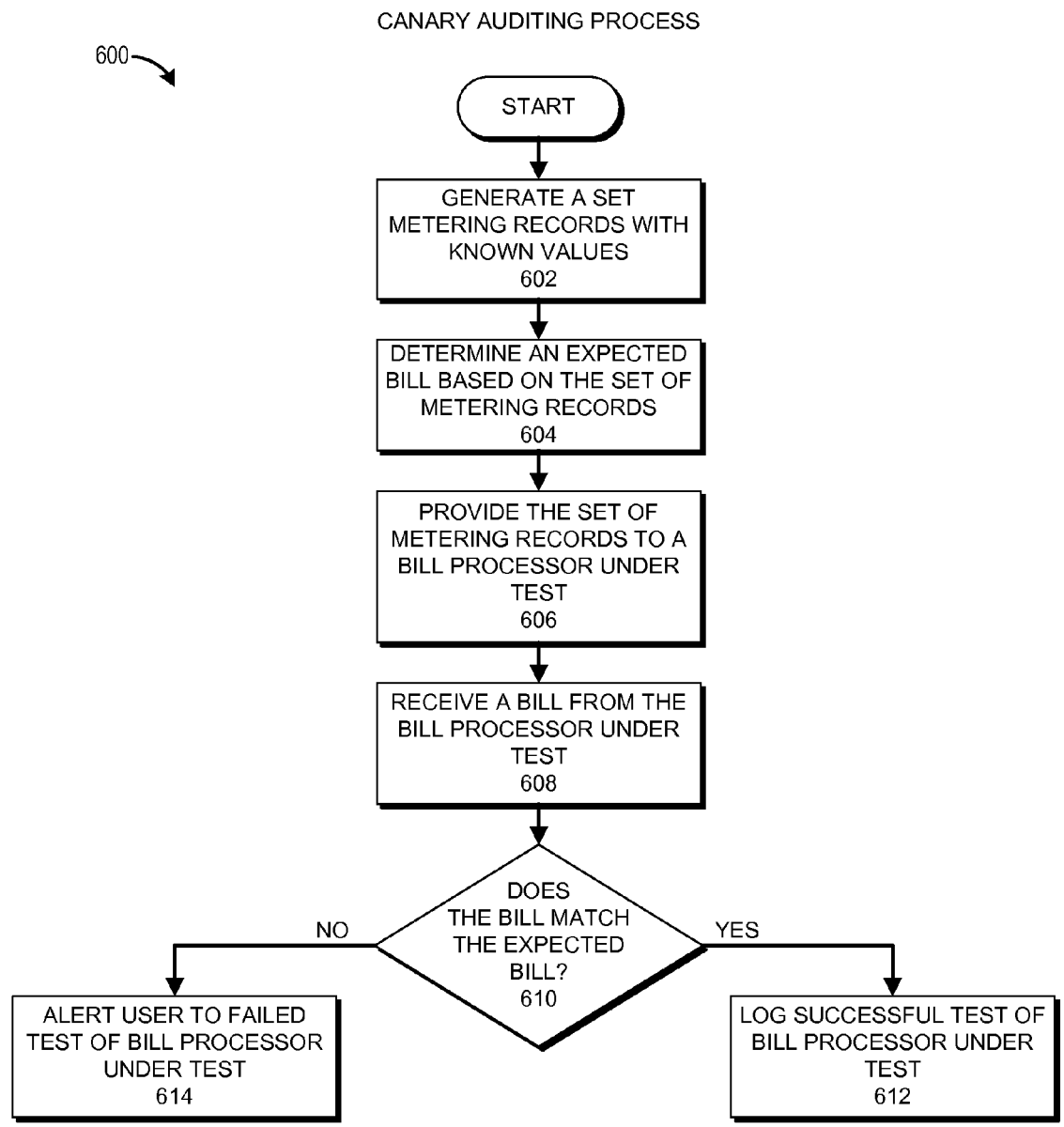
FIG. 6 presents a flowchart for an example of a canary auditing process.

FIG. 6 presents a flowchart for an example of a canary auditing process 600. The process 600 can be implemented by any system that can audit a bill processor (e.g., the billing processor 214) by providing a set of known metering records to the billing processor and determining whether the generated bill matches the expected bill for the metering records. For example, the process 600, in whole or in part, can be implemented by the auditors 220, the canary auditor 228, the metering aggregator 208, the data store 216, and the data record generator 206, to name a few. Although any number of systems, in whole or in part, can implement the process 600, to simplify discussion, the process 600 will be described with respect to particular systems.

The process 600 can be used with any type of data records. Further, the process 600 can be used to audit any type of processors and any type of outputs associated with the processors. However, to simplify discussion, the process 600 will be described with respect to metering records and generating bills to test a bill processor (e.g., the billing processor 214).

The process 600 begins at the block 602 when the canary auditor 228, for example, generates a set of metering records with known values. This set of metering records may include dummy data, or data that is generated for test purposes and not as a result of user activity at the data centers 106. In some embodiments, the canary auditor 228 may use the metering aggregator 208 to generate the set of metering records. The set of metering records may be associated with a set of billing metrics. For example, each of the metering records may include a quantity of virtual machines executed per hour and a price for each virtual machine for a user associated with a particular entity (e.g., a video-streaming entity may be charged $2 per virtual machine while a social networking entity may be charged $1.75 per virtual machine).

At block 604, the canary auditor 228 determines an expected bill based on the set of metering records generated at the block 602. In some embodiments, the canary auditor 228 may use the usage report generator 212 to facilitate generating a bill from the set of metering records with the known values. Further, in some cases, the canary auditor 228 may use a billing processor or billing module other than the billing processor under test to generate the expected bill at the block 604. The billing processor used by the canary auditor 228 to generate the expected bill may be a billing processor that has previously successfully passed an audit conducted by the canary auditor 228 or another auditor.

At block 606, the canary auditor 228 provides the set of metering records with the known values to a bill processor under test, such as the billing processor 214. The canary auditor 228 receives a bill from the bill processor under test at block 608. At decision block 610 the canary auditor 228 determines whether the bill received from the bill processor under test matches the expected bill. Determining whether the bill received from the bill processor under test matches the expected bill may include comparing individual entries on the bill, descriptions on the bill, usage values listed on the bill, cost per usage item on the bill, total cost for a usage item on the bill, total cost for all items on the bill, and the like.

If the canary auditor 228 determines at the decision block 610 that the bill received from the bill processor under test does not match the expected bill, the canary auditor 228 alerts a user (e.g., an administrator) to a failed test of the bill processor under test at the block 614. Alerting the user can include emailing the user, texting the user, displaying a dialog box to the user, sending a social media message to a user, or any other method for alerting a user. In some cases, the block 614 may include logging the failure of the bill processor under test. Further, in some cases, the block 614 may include performing additional tests on the bill processor under test. These additional tests may, for example, be used to narrow down the point of failure within the bill processor under test. In some embodiments, the block 614 may include removing the bill processor under test, at least temporarily, from the stream based data processing system 108.

If the canary auditor 228 determines at the decision block 610 that the bill received from the bill processor under test does match the expected bill, the canary auditor 228 logs a successful test of the bill processor under test at the block 612. In some embodiments, the block 612 may include configuring the bill processor under test for use with non-test data. In some embodiments, block 612 may be optional.

Example Amendment and Gating Process

Figure 7:
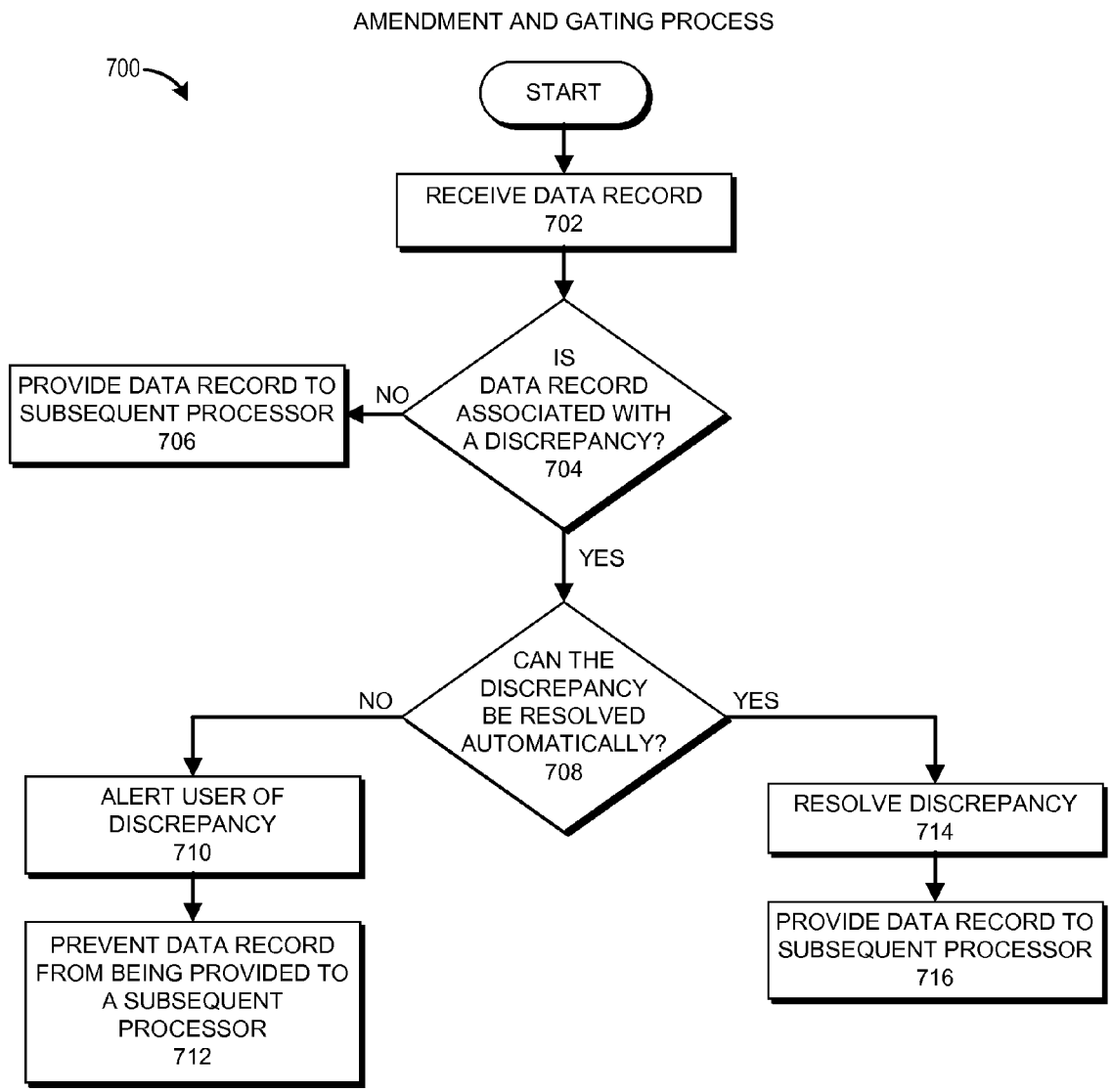
FIG. 7 presents a flowchart for an example of an amendment and gating process.

FIG. 7 presents a flowchart for an example of an amendment and gating process. The process 700 can be implemented by any system that can amend and/or gate data by, for example, preventing data from being provided to one or more processors. For example, the process 700, in whole or in part, can be implemented by the auditors 220, the amendment processor 210, and a gating processor 230, to name a few. Although any number of systems, in whole or in part, can implement the process 700, to simplify discussion, the process 700 will be described with respect to particular systems.

The process 700 begins at the block 702 when the gating processor 230, for example, receives a data record. In some embodiments, the gating processor 230 receives data at the block 702. In some cases, the data records are received from an auditor. In some such cases, the data records may be received from a communication channel established with the auditor. In other such cases, the data records may be received from the stream based data transport 204. In other cases, the data records may be received from another processor, such as the amendment processor 210.

At decision block 704, the gating processor 230 determines whether the data record is associated with a discrepancy. Determining whether the data record is associated with the discrepancy may include accessing metadata associated with the data record, which may be part of the data record or which may be stored at a repository, such as the data store 216. In some cases, the gating processor 230 determines that the data record is associated with a discrepancy based on information (e.g., an identifier) provided by an auditor or processor that provided the data record to the gating processor 230.

If the gating processor 230 determines that the data record is not associated with the discrepancy at the decision block 704, the gating processor 230 provides the data record to a subsequent processor, such as a usage report generator 212, at the block 706. Alternatively, the gating processor 230 may provide the data record to the stream based data transport 204 without providing the data record to a specific processor. In such cases, other processors may determine whether or not to access the data record provided by the gating processor 230 to the stream based data transport 204 based on the type of data record or data record access rules associated with the processor. Further, in some cases, the gating processor 230 may store the data record to the data store 216 in addition to, or instead of, providing the data record to a subsequent processor. In some embodiments, the decision block 704 may include determining the type of discrepancy associated with the data record. In some such cases, the gating processor 230 may determine whether to provide the data record to a subsequent processor based, at least in part, on the type of discrepancy associated with the data record. In some embodiments, the decision block 704 and the block 706 may be optional. For example, in some embodiments the gating processor 230 may be configured to only receive data records that are associated with discrepancies thereby, in some cases, making the decision block 704 superfluous.

If the gating processor 230 determines at the decision block 704 that the data record is associated with a discrepancy, the gating processor 230 determines whether the discrepancy can be resolved automatically at the decision block 708. In some cases, determining whether a discrepancy can be resolved automatically includes determining whether the discrepancy can be resolved without input from a user, such as an administrator. In some cases, even if the discrepancy can be resolved without input from the user, the modified data record may be presented to the user for confirmation before the process 700 proceeds further.

If the gating processor 230 determines that the discrepancy cannot be resolved automatically at the decision block 708, the gating processor 230 alerts a user, such as an administrator, of the discrepancy at the block 710. Alerting the user of the discrepancy can include any of the methods for alerting a user as described previously with respect to the block 614. Further, in some cases the block 710 can include logging the discrepancy at, for example, the data store 216. In some cases, the block 710 may be optional.

At block 712, gating processor 230 prevents the data record from being provided to a subsequent processor. In some cases, the block 712 may include preventing the data record from being provided to specific processors. In some such cases, the gating processor 230 may still permit the data record to be provided to other processors. Further, in cases where the data record is prevented from being provided to specific processors, the gating processor 230 may determine the processors to not receive the data record based on the type of discrepancy associated with the data record. In some embodiments, the gating processor 230 may not block the data record from being provided to a subsequent processor, but may mark the data record as including a discrepancy. Advantageously, in some embodiments, by marking the data record as including a discrepancy while allowing the data records to be provided to subsequent processors, the subsequent processors can tentatively process the data record. For example, a billing processor 214 can generate an estimated bill and mark the bill as being a non-final estimate containing a discrepancy or a potential discrepancy.

In some embodiments, the gating processor 230 may mark a particular customer or a type of data record (e.g., one relating to network usage) as having a discrepancy. By marking the customer or type of data record, a subsequent processor, in some cases, may be able to provide estimated bills while not generating final bills. In cases where a different processor generates the final bills from the processor that generates estimated bills, the gateway processor 230 may in the event of a discrepancy, allow that data records to go to the processor for generating the estimated bills, but not the processor for generating the final bills. Alternatively, the gating processor 230 may inform the processor that generates the final bills not to generate a bill for a customer who is associated with an identified discrepancy, or not to generate bills for a particular computing resource (e.g., network usage) due to an identified discrepancy.

If the gating processor 230 determines at the decision block 708 that the discrepancy can be resolved automatically, the gating processor 230 resolves the discrepancy at block 714. In some embodiments, resolving the discrepancy may include providing the data record to an amendment processor 210 for amendment. Amending the data record can include adjusting one or more values of the data record. In some cases, amending the data record may include generating a new data record for insertion into the stream based data transport 204 that resolves the discrepancy in combination with the data record received at the block 702. For example, if the data record indicates that a customer used five virtual machines when the auditor has determined that only four virtual machines were instantiated on the data center computers 110, the amendment processor 210 may generate a new data record with a value of negative one for the number of virtual machines activated over a time period consistent with the time period represented by the data record received at the block 702.

In some cases, the block 714 may include presenting the data record, with the discrepancy resolved, to a user for review. Further, in some such cases, the gating processor 230 awaits confirmation from the user before proceeding to block 716. Although the process 700 has primarily been described with respect to a single data record, the process 700 is not limited as such. Although data records can be processed as received, data records may also be batched and processed together. Thus, in some cases, a whole batch of data records may be presented to a user for approval at the block 714. In some cases, discrepancies may be caused by a failure event (e.g., a subsystem in a data center going down for a time period. In some such cases, some or all of the data records with discrepancies due to the failure event may be gathered or batched together for processing or resolution. The batch of data records with the resolved discrepancies may be presented together to an administrator for approval and, in some cases, to log the event and resolution of affected data records. In certain embodiments, the block 714 can include one or more embodiments described above with respect to the block 314, the block 512, and/or the block 562.

At block 716, the gating processor 230 provides the data record, with the discrepancy resolved, to subsequent processor. In some cases, the block 716 can include one or more of the embodiments previously described with respect to the block 706.

In some embodiments, a data record associated with a discrepancy may already have been processed by some systems before the discrepancy is detected. For example, a discrepancy in the measure of resource utilization by a user included in a first data record may not be detected until a later data record is processed, which may show total resources utilized at a computing system for the day. In such cases, the process 700 may determine whether the discrepancy can be resolved. If it is determined that the discrepancy cannot be resolved, the process 700 may include determining whether the data records associated with the discrepancy can be subtracted or removed from processing by subsequent processors. For example, the gating processor 230 may determine whether data records relating to network utilization by a user for a particular day can be removed from the data records that include network utilization of a computing system at a data center. If so, it may no longer be possible to provide the user with an accurate bill, but an estimated bill may be generated based on the data records associated with the user without the removed data records.

Example Data Display Process

Figure 8:
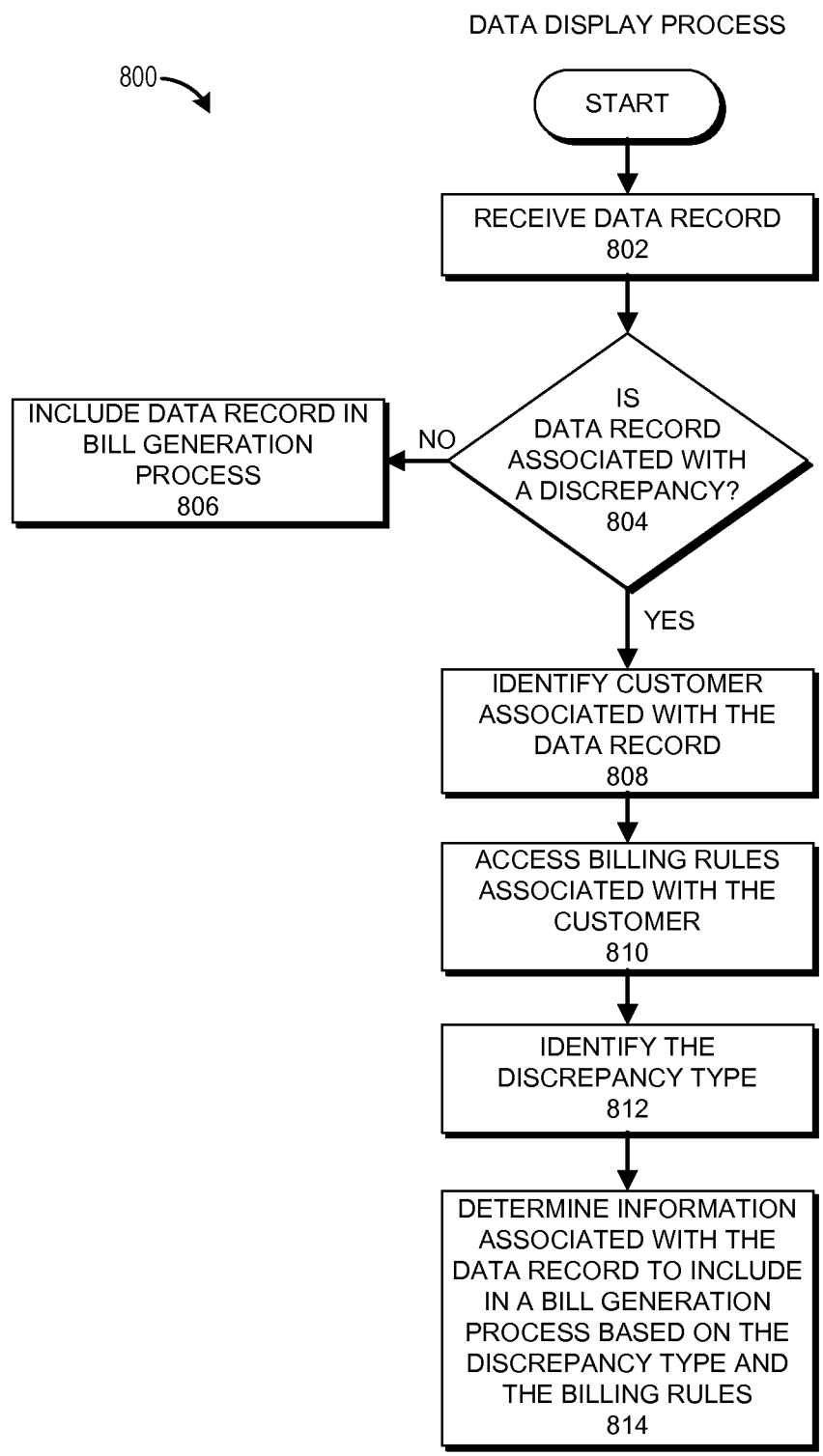
FIG. 8 presents a flowchart for an example of a data display process.

FIG. 8 presents a flowchart for an example of a data display process 800. The process 800 can be implemented by any system that can generate and display a bill to a user for utilization of computing resources at one or more data centers 106. For example, the process 800, in whole or in part, can be implemented by the usage report generator 212, the billing processor 214, and the gating processor 230 to name a few. Although any number of systems, in whole or in part, can implement the process 800, to simplify discussion, the process 800 will be described with respect to particular systems.

The process 800 begins at the block 802 when the billing processor 214, for example, receives a data record. In some embodiments, the block 802, using the billing processor 214, can include one or more of the embodiments described above with respect to the block 702. At the decision block 804, the billing processor 214 determines whether the data record is associated with the discrepancy. In some embodiments, the decision block 804, using the billing processor 214, may include one or more embodiments described above with respect to the block 704.

If the billing processor 214 determines that the data record is not associated with a discrepancy, the gating processor 230 may include the data record in a bill generation process at block 806 by, for example, providing the data record to a billing processor (e.g., the billing processor 214). Alternatively, or additionally, the block 806 may include providing the data record to another processor for displaying data associated with the data record (e.g., the usage report generator 212).

If the billing processor 214 determines that the data record is associated with a discrepancy, the billing processor 214 identifies a customer associated with the data record at block 808. Determining the customer associated with the data record may include accessing metadata associated with the data record, accessing a value included in the data record, and/or accessing information associated with the data record that is stored at the data store 216. At the block 810, the billing processor 214 accesses billing rules associated with the customer identified at the block 808. These billing rules may be accessed from a repository, such as the data store 216.

At block 812, the billing processor 214 identifies the discrepancy type for the discrepancy identified at the decision block 804. The billing processor 214 determines, at block 814, information associated with the data record to include in a bill generation process based, at least in part, on the discrepancy type and/or the billing rules associated with the customer. For example, the billing processor 214 may determine whether to present the values in the data record that include the discrepancy in a bill to the customer based, at least in part, on the discrepancy type and/or the billing rules associated with the customer. As a second example, the billing processor 214 may determine whether to present a reason to the customer for the discrepancy based, at least in part, on the discrepancy type and/or the billing rules. In some embodiments, the billing processor 214 may determine type of bill to generate based on one or more of the discrepancy type and the billing rules associated with customer. For example, if the discrepancy relates to a fee charged to the customer, the billing processor 214 may generate an estimated daily bill, but may prevent generation of final monthly bills. As a second example, if the discrepancy relates to a number of virtual machine instance is used by the customer and the customer is associated with an unlimited virtual machine usage plan, the billing processor 214 may generate both estimated daily bills and final monthly bills for the customer regardless of the identified discrepancy.

As previously stated, one or more of the operations associated with the process 800 may be performed by the gating processor 230. In some such cases, the block 814 may include determining what information the gating processor 230 may provide to a billing processor 214.

Example Graphical User Interface for a Billing Page

FIG. 9 illustrates an example graphical user interface (GUI) for a billing page 900. The billing page 900 presents a non-limiting example of a bill that may be presented to a user, such as an administrator or a customer of the data centers 106. The bill represented by the billing page 900 may be a non-final estimated bill or a final bill presented, for example, to a customer for payment by the customer. Alternatively, instead of a bill, the billing page 900 may present a usage report of computing resources and their corresponding prices consumed by a user.

The billing page 900 may include entries 902, 904, 906, each of which may be associated with different dates. Each date may list entries for different computing resources consumed by the user, or by users (e.g., employees, customers, etc.) associated with an entity. For example, as shown in FIG. 9, the measured and billed computing resources may include virtual machine instances 908 used, data bandwidth 910 used, and storage capacity 912 used for each date. Further each entry for each computing resource may include the total quantity of the resource used for that date, the cost per unit of the resource used (e.g., cost per virtual machine instance, cost per gigabyte of data bandwidth, cost per terabyte storage, etc.), and the total cost for the for the computing resource used for the date entry. Thus, for example, a billing page 900 indicates that for the data bandwidth 910 used on Mar. 13, 2012, the user used 23 GB of data bandwidth at a cost of two dollars per gigabyte resulting in a total cost of $46 for the quantity of data received or transmitted by data center computers 110 utilized by the user.

As previously described, the billing processor 214 can determine information to be presented to a user based on, for example, billing rules associated with the user. This concept of presenting, or not presenting, certain information to a user is illustrated in FIG. 9 by the fine print entries 920, 922, 924 corresponding to the fine print callouts 930, 932, 934, respectively. For example, the fine print entry 926 of the fine print callouts 930 indicates that information is unavailable at the time that the billing page 900 was created due to a metering discrepancy. As a result, the virtual machine instances entry 908 associated with the Mar. 13, 2012 date is left blank.

As can be seen from the entries associated with the fine print callouts 932 and 934, amendments made to resolve discrepancies may be shown in the entries of the billing page 900. For example, the virtual machine instances entry 908 associated with the Mar. 14, 2012 date indicates that 25 virtual machine instances were removed from the measured total of 354 virtual machine instances. In some embodiments, as illustrated by the fine print entry 922, the reason for an amendment may be presented to the user. In the case of the fine print entry 922, the adjustment made to the virtual machine instances of Mar. 14, 2012 is due to an adjustment for a billing discrepancy that took place on Mar. 7, 2012.

Further, as illustrated by the fine print entry 922, the reason for the discrepancy may also be presented to the user. Thus, in the case of the fine print entry 922, the billing discrepancy was related to a server crash at a data center accessed by the user. Further, as can be seen from the fine print entry 922, in some cases, billing adjustments may be a result of incidents that occurred during a prior time period. However, as can be seen from the fine print entry 924, in some cases, billing adjustments may be a result of incidents that occurred on the day of the billing adjustment.

Although the billing page 900 illustrates several billing discrepancies and the reasons for the billing discrepancies, in some cases a billing discrepancy may not be presented to a user. In such cases, an entry may indicate the final result of a resolution of the billing discrepancy without indicating that a billing discrepancy may have existed. In other such cases, data from an entry may not be presented until a billing discrepancy is resolved. In certain cases, whether or not a billing discrepancy or other discrepancy is presented to a user may depend on the user or the billing rules associated with the user. For example, discrepancies may be presented to users associated with an entity who are managers or billing personnel, but may be withheld from other users associated with the entity.

TERMINOLOGY

A number of computing systems have been described throughout this disclosure. The descriptions of these systems are not intended to limit the teachings or applicability of this disclosure. For example, the amendment processor 210, the billing processor 214, the gating processor 230, and/or one or more of the auditors described herein can generally include any computing device(s), such as desktops, laptops, servers, and distributed computing systems, to name a few. As a second example, the user computing systems 102 can generally include any computing device(s), such as desktops, laptops, servers, video game platforms, television set-top boxes, televisions (e.g., internet TVs), computerized appliances, and wireless mobile devices (e.g. smart phones, PDAs, tablets, electronic book readers, or the like), to name a few. Further, it is possible for the systems described herein to be different types of devices, to include different applications, or to otherwise be configured differently. In addition, the systems described herein can include any type of operating system ("OS"). For example, the systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the auditors 220 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of auditing data records, the method comprising:
under control of an auditor comprising one or more processors configured to access data records from a stream of data records, the stream of data records including data corresponding to a measure of usage of computing resources within a program execution service:
identifying a first set of data records from the stream of data records, the first set of data records obtained from a first data source via a communication channel between the first data source and the auditor within the program execution service, the program execution service distributed among a plurality of servers;
accessing a second set of data records from the stream of data records, the second set of data records at least partially independent from the first set of data records;
auditing the first set of data records based, at least in part, on the second set of data records by determining whether the first set of data records conforms to the second set of data records within a threshold degree of error;
in response to determining that the first set of data records does not conform to the second set of data records within the threshold degree of error:
determining a discrepancy between the first set of data records and the second set of data records;
determining whether the discrepancy can be resolved without user involvement based, at least in part, on a type of the discrepancy;
in response to determining that the discrepancy can be resolved without user involvement, amending the first set of data records to resolve the discrepancy, wherein amending the first set of data records includes generating a new data record that in combination with the first set of data records resolves the discrepancy; and
in response to determining that the discrepancy cannot be resolved without user involvement, using a distributed gating processor to prevent access by a subsequent processor to a subset of the first set of data records corresponding to the discrepancy reducing the quantity of data supplied to the subsequent processor for processing; and
generating a user interface that presents a usage report to a user, the usage report generated based at least in part on the first set of data records, wherein the usage report excludes data corresponding to the subset of the first set of data records when it is determined that the discrepancy cannot be resolved without user involvement.

2. The method of claim 1, wherein the second set of data records is obtained from a second data source.

3. The method of claim 2, wherein the method further comprises:
determining a statistical relationship between the first data source and the second data source; and
generating an expected set of data records based, at least in part, on the statistical relationship and the second set of data records,
wherein determining whether the first set of data records conforms to the second set of data records within the threshold degree of error comprises determining whether the first set of data records matches the expected set of data records within the threshold degree of error.

4. The method of claim 3, wherein determining the statistical relationship between the first data source and the second data source comprises determining a statistical relationship between a metric included in data records from the first data source and a corresponding metric included in data records from the second data source.

5. The method of claim 1, wherein the first set of data records and the second set of data records are of different types.

6. The method of claim 1, wherein the first set of data records and the second set of data records are associated with the consumption of the same set of computing resources and are generated by different systems.

7. The method of claim 1, wherein the first set of data records and the second set of data records are collected over a first time period and are batched together for auditing at a second time period.

8. The method of claim 1, wherein the second set of data records comprises data records obtained from the first data source that were generated during an earlier time period than a time period during which the first set of data records were generated.

9. The method of claim 8, wherein the method further comprises:
calculating a statistical trend for at least one metric included in each data record of the second set of data records; and
generating an expected set of data records for the time period during which the first set of data records were generated based, at least in part, on the statistical trend,
wherein determining whether the first set of data records conforms to the second set of data records within the threshold degree of error comprises determining whether the values for the at least one metric in the first set of data records matches the values for the at least one metric in the expected set of data records within the threshold degree of error.

10. The method of claim 1, further comprising alerting a user to the discrepancy in response to determining that the discrepancy cannot be resolved without user involvement.

11. The method of claim 1, wherein determining whether the discrepancy can be resolved comprises determining whether a probability that the discrepancy can be resolved satisfies a certainty threshold.

12. A system, the system comprising:
one or more computer systems configured to effect a stream based data processing system, the stream based data processing system configured to:
access a set of one or more data records from a stream of data records, the set of one or more data records obtained from a first data source via a communication channel between the first data source and an auditor and comprising a time series of data records, the stream of data records generated by a set of computing systems configured to provide multi-tenant network services to users, the set of one or more data records including data corresponding to a measure of usage of computing resources of the set of computing systems, the set of computing systems implementing a program execution service distributed among the set of computing systems;

access a set of data from a second data source other than the stream of data records; and determine whether at least one data record from the set of one or more data records includes a discrepancy based, at least in part, on the set of data;

the stream based data processing system including an amendment system comprising one or more processors, the amendment system configured to conditionally resolve a discrepancy in at least one data record from the set of one or more data records in response to determining that the at least one data record from the set of one or more data records includes the discrepancy and that the discrepancy can be resolved automatically, wherein conditionally resolving the discrepancy comprises generating a new data record that in combination with the one or more data records resolves the discrepancy;

a distributed gating processor configured to prevent access by one or more additional processors to the at least one data record reducing the quantity of data supplied to the subsequent processor for processing in response to determining that the discrepancy cannot be resolved automatically; and a user interface system configured to generate a user interface that presents a usage report to a user, the usage report generated based at least in part on the set of one or more data records, wherein the usage report excludes data corresponding to the at least one data record when it is determined that the discrepancy cannot be resolved automatically.

13. The system of claim 12, wherein the stream based data processing system is further configured to:
perform an operation on the set of one or more data records, and
determine whether at least one data record from the set of one or more data records includes the discrepancy by comparing a result of the operation to the set of data.

14. The system of claim 12, wherein the set of data comprises a second set of data records.

15. The system of claim 14, wherein the stream based data processing system is further configured to:
perform an operation on the set of one or more data records to obtain a first result;
perform the operation on the second set of data records to obtain a second result; and
determine whether at least one data record from the set of one or more data records includes the discrepancy by comparing the first result to the second result.

16. The system of claim 14, wherein the stream based data processing system is further configured to:
determine a statistical relationship between data records of the first data source and data records of the second data source; and
generate an expected set of data records based on the statistical relationship and the second set of data records;
wherein the auditor determines whether at least one data record from the set of one or more data records includes the discrepancy by comparing the set of one or more data records to the expected set of data records.

17. The system of claim 12, wherein the amendment system further configured to conditionally resolve the discrepancy by:
determining the type of the discrepancy;
determining, based at least in part, on the type of the discrepancy whether the discrepancy can be resolved automatically; and
in response to determining that the discrepancy can be resolved automatically, amending the set of one or more data records to resolve the discrepancy and to obtain an amended set of data records.

18. The system of claim 17, wherein the stream based data processing system is further configured to audit the amended set of data records.

19. The system of claim 12, wherein the stream based data processing system further comprises a plurality of auditor computer systems, and wherein determining whether at least one data record from the set of one or more data records includes the discrepancy comprises providing the set of one or more data records and the set of data to a selected auditor computer system from the plurality of auditor computer systems.

20. The system of claim 19, wherein the selected auditor computer system is selected based, at least in part, on a user associated with the set of one or more data records thereby enabling data records from the user to be provided to the same auditor computer system for processing.

21. The system of claim 12, wherein the second data source comprises a repository.

* * * * *